(No Model.) 6 Sheets—Sheet 1.
L. K. JOHNSON.
TYPE SETTING APPARATUS.
No. 539,947. Patented May 28, 1895.
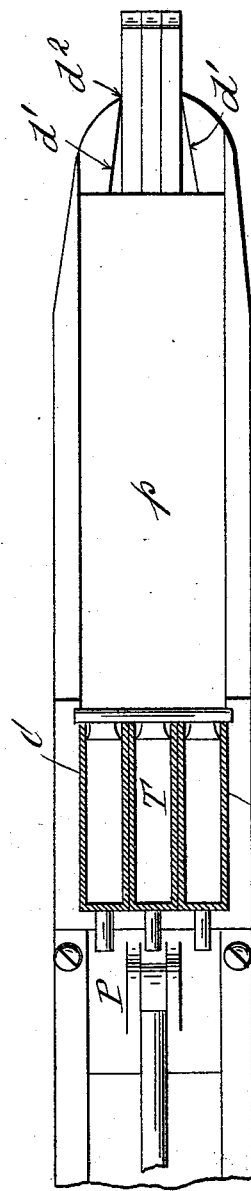
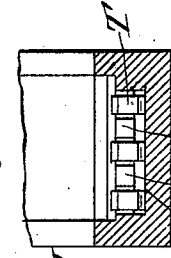
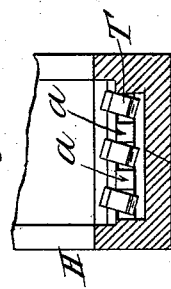
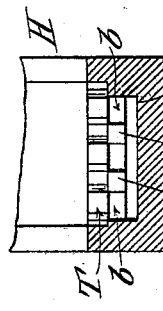
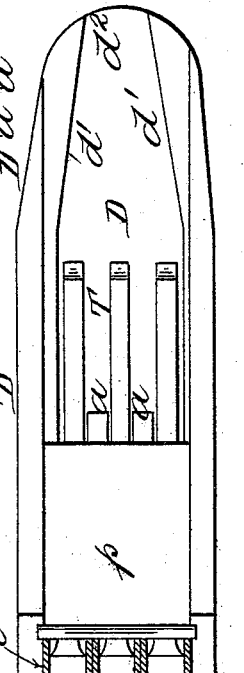
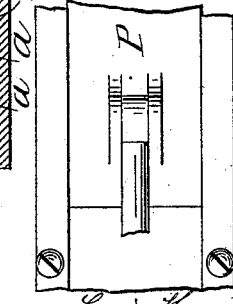
Witnesses:
D. W. Gardner
August Chapman
Inventor:
Louis Kossuth Johnson
By George William Miatt
Attorney (No Model.) 6 Sheets—Sheet 2.
L. K. JOHNSON.
TYPE SETTING APPARATUS.
No. 539,947. Patented May 28, 1895.
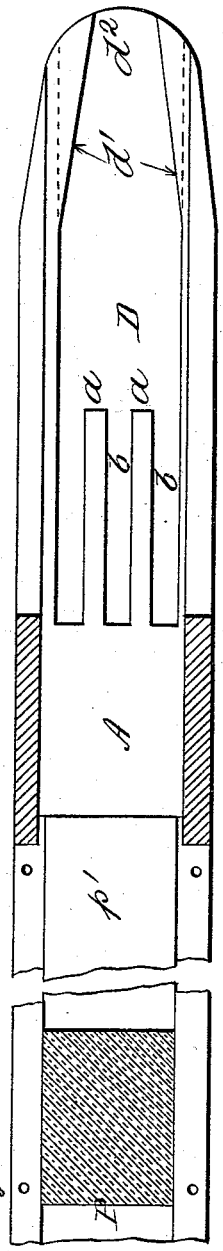
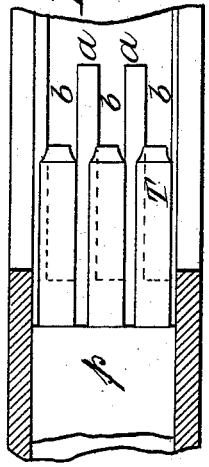
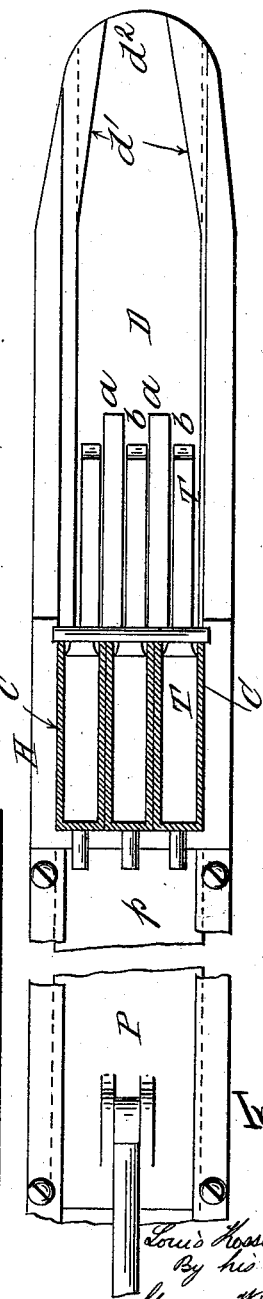
Witnesses:
Inventor:
Louis Kossuth Johnson
By his attorney
George William Miatt (No Model.)  6 Sheets—Sheet 3.
L. K. JOHNSON.
TYPE SETTING APPARATUS.
No. 539,947. Patented May 28, 1895.
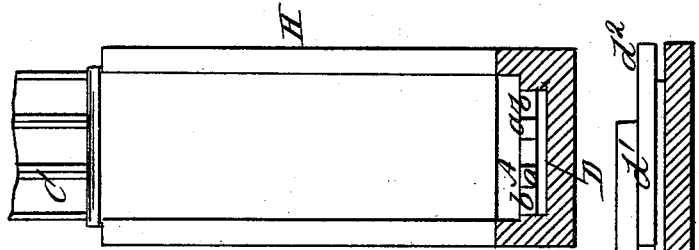
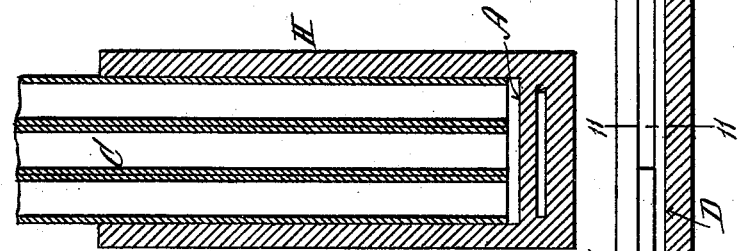
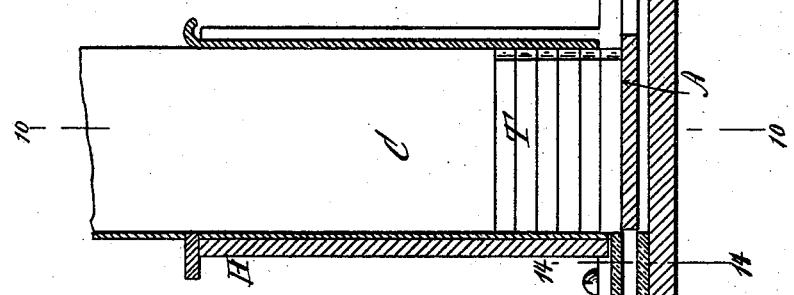

(No Model.) 6 Sheets—Sheet 4.
L. K. JOHNSON.
TYPE SETTING APPARATUS.
No. 539,947. Patented May 28, 1895.
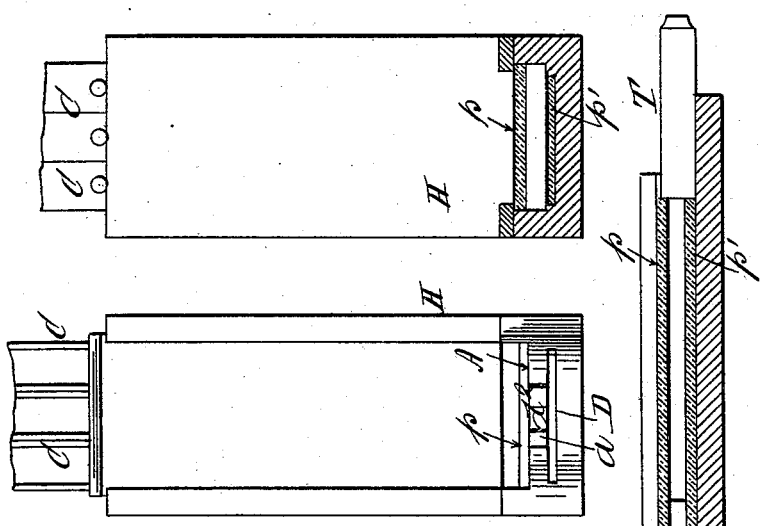
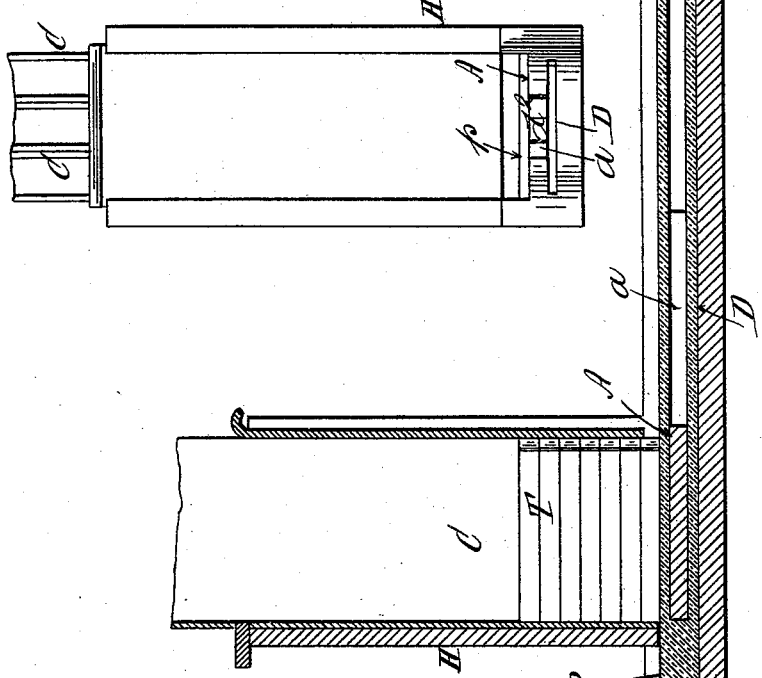

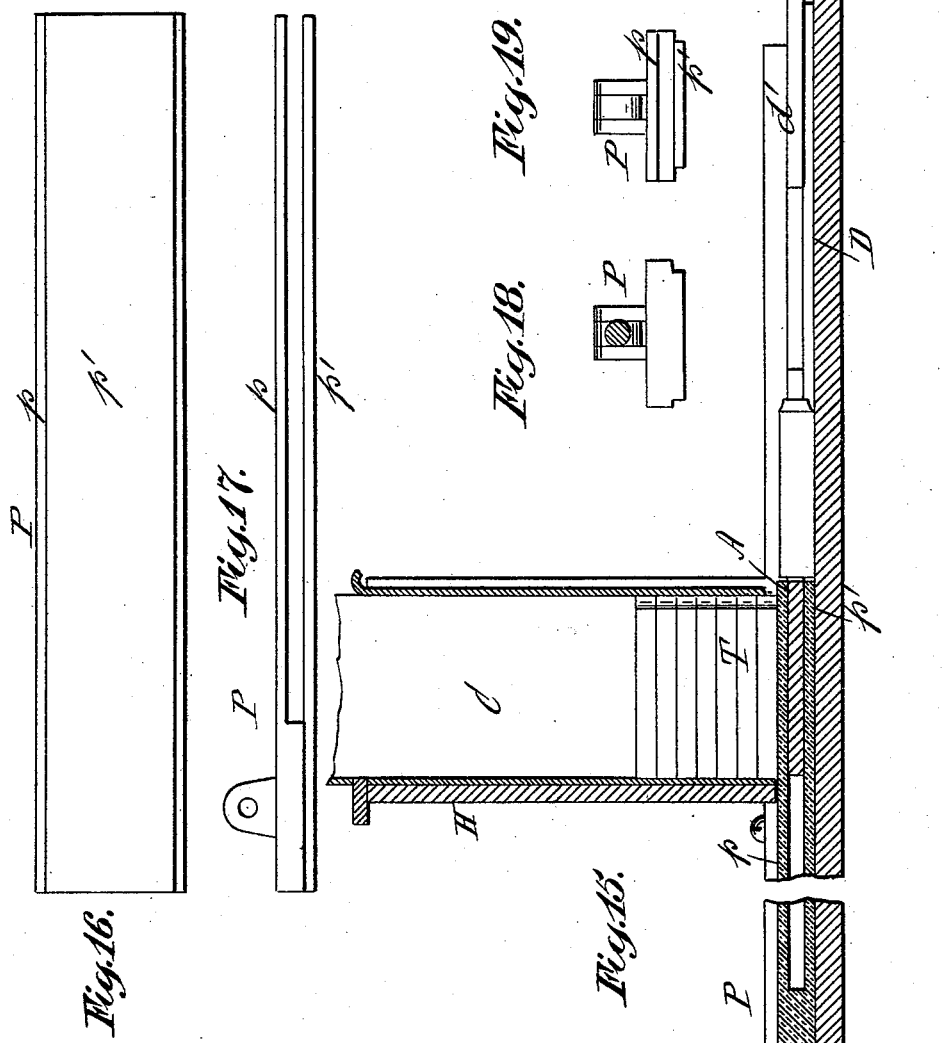

(No Model.)  
L. K. JOHNSON.  
TYPE SETTING APPARATUS.  
No. 539,947. Patented May 28, 1895.
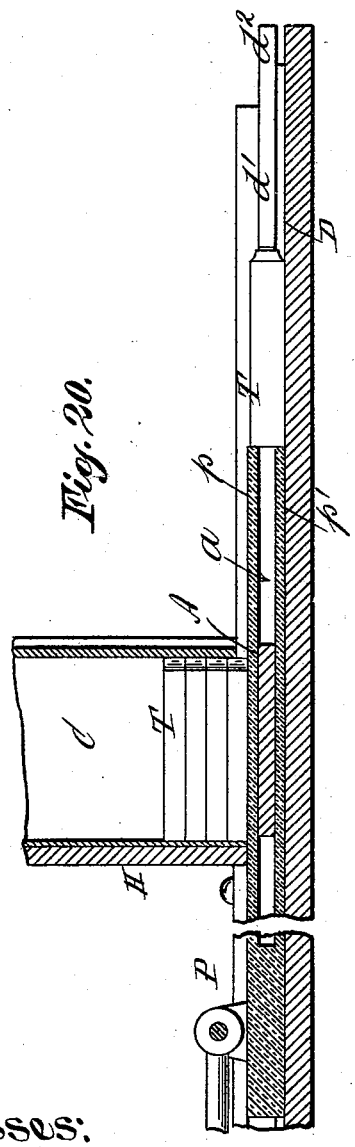
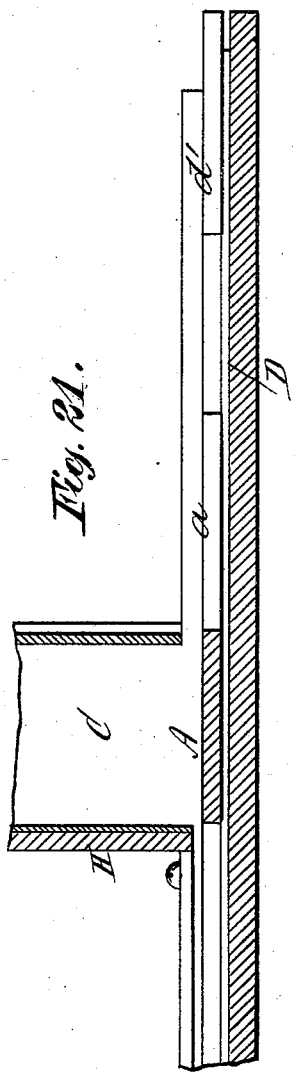
Witnesses:  
D. W. Gardner  
August Hofmann  
Inventor:  
Louis Kossuth Johnson  
By his Attorney,  
George William Miatt

UNITED STATES PATENT OFFICE.

LOUIS KOSSUTH JOHNSON, OF BROOKLYN, ASSIGNOR TO THE ALDEN TYPE MACHINE COMPANY, OF NEW YORK, N. Y.

TYPE-SETTING APPARATUS.

SPECIFICATION forming part of Letters Patent No. 539,947, dated May 28, 1895.

Application filed September 15, 1894. Serial No. 523,073. (No model.)

*To all whom it may concern:*

Be it known that I, LOUIS KOSSUTH JOHNSON, a citizen of the United States, residing in the city of Brooklyn, in the county of Kings and State of New York, have invented certain new and useful Improvements in Type-Setting Apparatus, of which the following is a specification sufficient to enable others skilled in the art to which the invention appertains to make and use the same.

My improvements relate to the class of type setting apparatus, in which the types are arranged in prescribed positions with relation to each other in type containing channels from the lower ends of which they are successively forwarded into position to be grasped by the fingers for removal to the stick.

The present application is for means for turning the types upon their edges when they are arranged in type containing channels on their flat side as set forth in my application for patent filed September 14, 1894. In the said concurrent application the types are caused to pass through quarter turn twist grooves. The essential feature of my present invention consists in an arrangement of parts by which the types are turned by the aid of gravity alone; and in the special construction of the type forwarder adapting it to the forwarding of types of different widths.

Figure 1 is a plan of my improved device, showing the type-containing channels in section and the type-forwarder at the completion of its forward stroke; Fig. 2, a similar view with the types partially advanced. Fig. 3 is a detail in vertical section showing the position of the types just prior to their change in position. Fig. 4 is a similar view showing the types turning as they drop; Fig. 5, a similar view showing their position after they have completed the quarter-turn. Fig. 6 is a horizontal section showing the type-platform, &c., the pusher being retracted; Fig. 7, a detail showing the pusher advancing the types prior to their fall; Fig. 8, a view similar to Fig. 2, showing the types immediately after they have dropped; Fig. 9, a central vertical section of the parts, showing the type-forwarder retracted; Fig. 10, a transverse section upon plane of line 10 10, Fig. 9; Fig. 11, a transverse section of the type-floor upon plane of line 11 11, Fig. 9; Fig. 12, a central vertical section showing the type-forwarder fully advanced; Fig. 13, a front elevation; Fig. 14, a section of the bed upon plane of line 14 14, Fig. 9. Fig. 15 is a central vertical section of the parts just after the type has dropped. Fig. 16 is a view of the under side of the pusher. Fig. 17 is a side elevation of the same. Fig. 18 is a rear view of the pusher; Fig. 19, a front view of the pusher; Fig. 20, a central vertical section illustrating the position of parts as the types are about to converge; Fig. 21, a similar view, the pusher and types being omitted.

The type containing channels C, are supported in a common holder H, as heretofore. The types T, are supported in the channels upon a type platform A. This platform A, has extensions $a, a$, projecting forward, between which are the recesses $b, b$, opening to the type forwarding platform D. The width of the extensions $a, a$, is such as to contract the recesses $b, b$, to a less width than the width of the types T so that, as will be seen by reference to Fig. 7, as the types advance from the platform A, they will be supported on one side by the extensions $a$, and till the heels of the types clear the front edge of the platform A, when they will drop through the recesses $b, b$, to the type forwarding table D. As they do this, being supported on one side by the extensions $a$, for a time they naturally make a quarter turn upon their longitudinal axes in descending, landing upon the table D, upon their edges as indicated in Fig. 5. The continued forward movement of the pusher P, carries them through the contracted passage formed by and between the converging side walls $d', d'$, and projects them through the port $d^2$.

In order to adapt the device to the handling of types of different widths I employ a double bladed pusher P, the upper blade $p$, of which passes over and above the type platform A, and extensions $a$, while the lower blade $p'$, rests upon the type forwarding platform D, passing underneath the type platform A, and extensions $a$. Thus the lower blade $p'$, is sure to encounter the heels of even the narrowest type after they have been pushed from the type platform A, by the upper blade

*p*, of the pusher P. The pusher P, is reciprocated automatically and intermittently by any of the means heretofore described.

What I claim as my invention, and desire to secure by Letters Patent, is—

1. In a type case, the combination of type containing channels supported independently, a type forwarder, a type supporting platform for sustaining the types in the channels formed with extensions with recesses between them and a type forwarding and presenting platform the whole arranged and operating substantially in the manner described.

2. In a type case, the combination of a plurality of type containing channels supported independent of the types contained therein, a type platform sustaining the types in the channels formed with extensions having recesses between them through which the types turn in dropping and a lower type supporting and forwarding surface for converging and presenting the types, substantially in the manner and for the purpose described.

3. In a type case, the combination of the type containing channels C, supported independent of the types contained therein, the upper type platform A, formed with the extensions $a$, and recesses $b$, the lower type platform D, formed with the converging side walls $d'$, $d'$, and the reciprocating type forwarder P, arranged and operating substantially in the manner set forth.

4. In a type case, the combination of a series of type containing channels supported independently an upper type platform for sustaining the types in said channels formed with extensions having recesses between them a lower type forwarding and supporting platform and a double bladed pusher the upper blade of which detaches and forwards the types successively from the upper platform and the lower blade of which forwards the type on the lower platform substantially in the manner and for the purpose described.

LOUIS KOSSUTH JOHNSON.

Witnesses:
D. W. GARDNER,
AUGUST WASSMANN.